United States Patent
Yan et al.

(10) Patent No.: US 6,792,144 B1
(45) Date of Patent: Sep. 14, 2004

(54) SYSTEM AND METHOD FOR LOCATING AN OBJECT IN AN IMAGE USING MODELS

(75) Inventors: Yong Yan, Yorktown Heights, NY (US); Kiran Challapali, Stamford, NY (US); Richard Y. Chen, Croton-on-Hudson, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/518,028

(22) Filed: Mar. 3, 2000

(51) Int. Cl.$^7$ .............................. G06K 9/00; G06K 9/66
(52) U.S. Cl. ....................................... 382/190; 382/118
(58) Field of Search ................................ 382/118, 190, 382/195, 201, 217, 209, 199, 215, 241

(56) References Cited

U.S. PATENT DOCUMENTS

| | | | |
|---|---|---|---|
| 5,719,951 A | * 2/1998 | Shackleton et al. | 382/118 |
| 5,742,294 A | * 4/1998 | Watanabe et al. | 382/118 |
| 5,852,669 A | 12/1998 | Eleftheriadis et al. | 382/118 |
| 5,901,244 A | 5/1999 | Souma et al. | 382/190 |
| 5,995,639 A | * 11/1999 | Kado et al. | 382/118 |
| 6,044,168 A | * 3/2000 | Tuceryan et al. | 382/118 |
| 6,526,161 B1 | 2/2003 | Yan | 382/118 |

FOREIGN PATENT DOCUMENTS

| | | | |
|---|---|---|---|
| EP | 0635981 A1 | 1/1995 | H04N/7/14 |
| EP | 0753969 A2 | 1/1997 | H04N/7/26 |
| WO | 9922318 | 5/1999 | |
| WO | 9953443 | 10/1999 | |

OTHER PUBLICATIONS

Antoszczyszyn, "Reliable tracking of facial features in semantic–based video coding", IEE Procs.–Vis. Images Signal Process., vol. 145, No. 4, Aug. 1998.*

Chun–Hung Lin & Ja–Ling Wu, Neural Networks, 1997., International Conference on, vol.:3, Jun. 9–12, 1997 Page(s): 1363–1367 vol. 3 "Automatic facial Extraction by applying genetic algorithm".*

"Two–Dimensional Signal and Image Processing", by J.S. Lim, Signals, Systems, and the Fourier Transform, Englewood Cliffs, NJ 1990, pp. 42–43.

"Image Sequence Coding at Very Low Bitrates: A Review", by Haibo Li et al, IEEE, Vol 3, No. 5, Sep. 1994, pp. 589–609.

"Feature Extraction from Faces Using Deformable Templates", by Alan L. Yuille et al, International Journal of Computer Vision, Aug. 2, 1992, pp. 99–111.

"Facial Model Refinement Using Stereo Image Sequence", by Chung J. Kuo et al, Signal and Media Laboratory Deprt. of Electrical Engineering, National Chung Chen University, Chiayi, Taiwan.

"Depth Discontinuities by Pixel–to–Pixel Stereo", by Stan Birchfield et al, Proceedings of the 1998 IEEE International conference on Computer Vision, Bombay, India.

PHA 23.813, U.S. Ser. No. 09/422,735, Filed: Oct. 21, 1999.

* cited by examiner

*Primary Examiner*—Leo Boudreau
*Assistant Examiner*—Tom Y. Lu

(57) ABSTRACT

A method and image processing system are disclosed that extract feature information from an image using a model. An object in the image is first identified. The model is used at the front-end to quickly determine/define the approximate location/position of specific features of the object. Based in this modeling information, the location/position of the specific features are then determined. A feedback process may also be used to update/customize the model and improve performance.

20 Claims, 4 Drawing Sheets

SYSTEM AND METHOD FOR LOCATING AN OBJECT IN AN IMAGE USING MODELS

FIELD OF THE INVENTION

The present invention pertains generally to the field of image processing, and in particular, the invention relates to a system and method for determining information related to features of an object in a digital image using models.

BACKGROUND OF THE INVENTION

Systems and methods are known that analyze digital images and recognize, for example, human faces. Determining the existence of a human face in an image or extracting facial feature information has been used for various applications such as in automated/surveillance systems, monitoring systems, human interfaces to computers, television and video signal analysis.

Conventional detection systems use methods such as color tone detection, template matching or edge detection approaches. There are, however, numerous shortcomings to these types of conventional systems. In general, they lack robustness, e.g., due to variations in human races, facial expression and lighting conditions.

More particularly, in systems using template matching, facial templates are first determined based upon average positions of facial features (i.e., eyes, nose and mouth) for a particular sex or race. A digital image is then matched to a template to identify sex or race. One shortcoming of this type of system is that expressions, e.g., a smile, may cause the wrong template to be used which leads to incorrect results. Another shortcoming of this method is that the exact positions of facial feature such as the eyes and nose are not actually determined. Facial color tone detection and template matching typically only determine whether a human face is present in an image.

Conventional edge detection approaches, however, are known to locate the position of eyes. Edge detection approaches are effective in this application because the eyes typically have high edge density values. However, eye glasses and facial hair such as a mustache may cause erroneous results. In addition, edge detection can not typically be used to determine the position of other facial feature such as a nose. Such edge detection approaches are also slow because a global search/operation must be preformed on the entire image.

This delay or slow processing degrades, for example, video/image communication applications over the Internet or Public Switch Telephone Network (PSTN). In conventional video/image communication technology a picture (in a JPEG, MPEG or GIF format) is captured and then transmitted over a transmission network. This approach, however, requires a large bandwidth because of the size (i.e., the amount of data) of the information.

Methods have been used to improve video/image communication and/or to reduce the amount of information required to be transmitted. One method is called model-based coding. Low bit-rate communication can be achieved by encoding and transmitting only representative parameters of an object in an image. At the remote site, the object is synthesized using the transmitted parameters.

One of the most difficult problems in model-based coding is providing feature correspondence quickly, easily and robustly. In sequential frames, the same features must be matched correctly. Conventionally, a block-matching process is used to compare pixels in a current frame and a next frame to determine feature correspondence. If the entire frame is searched for feature correspondence, the process is slow and may yield incorrect results due to mismatching of regions having the same gradient values. If only a subset of the frame is searched, the processing time may be improved. However, in this situation, the process may fail to determine any feature correspondence.

There thus exists in the art a need for improved systems and methods for extraction of object features from images and feature correspondence matching in images.

BRIEF SUMMARY OF THE INVENTION

One aspect of the present invention to provide a feature extraction system that uses front-end models to define regions of interest in an image so that positions of specific feature are determined quickly.

In another aspect of the present invention, an image processing device includes front-end modeling of an object in an image to improve accuracy and reduce processing time of feature determination, as well as reduce the amount of memory required to store information related to features of the object and overall image.

One embodiment of the invention relates to an image processing apparatus including an object detector arranged to determine whether an object is present in image data, at least one model of the object, and a feature extractor which identifies at least one feature of the object. The feature is identified in accordance with the model.

Another embodiments of the invention relate to a memory medium and method of determining positions of facial features in an image.

These and other embodiments and aspects of the present invention are exemplified in the following detailed disclosure.

BRIEF DESCRIPTION OF DRAWINGS

The features and advantages of the present invention can be understood by reference to the detailed description of the preferred embodiments set forth below taken with the drawings, in which.

DESCRIPTION OF THE PREFERRED EMBODIMENTS

Figure 1:
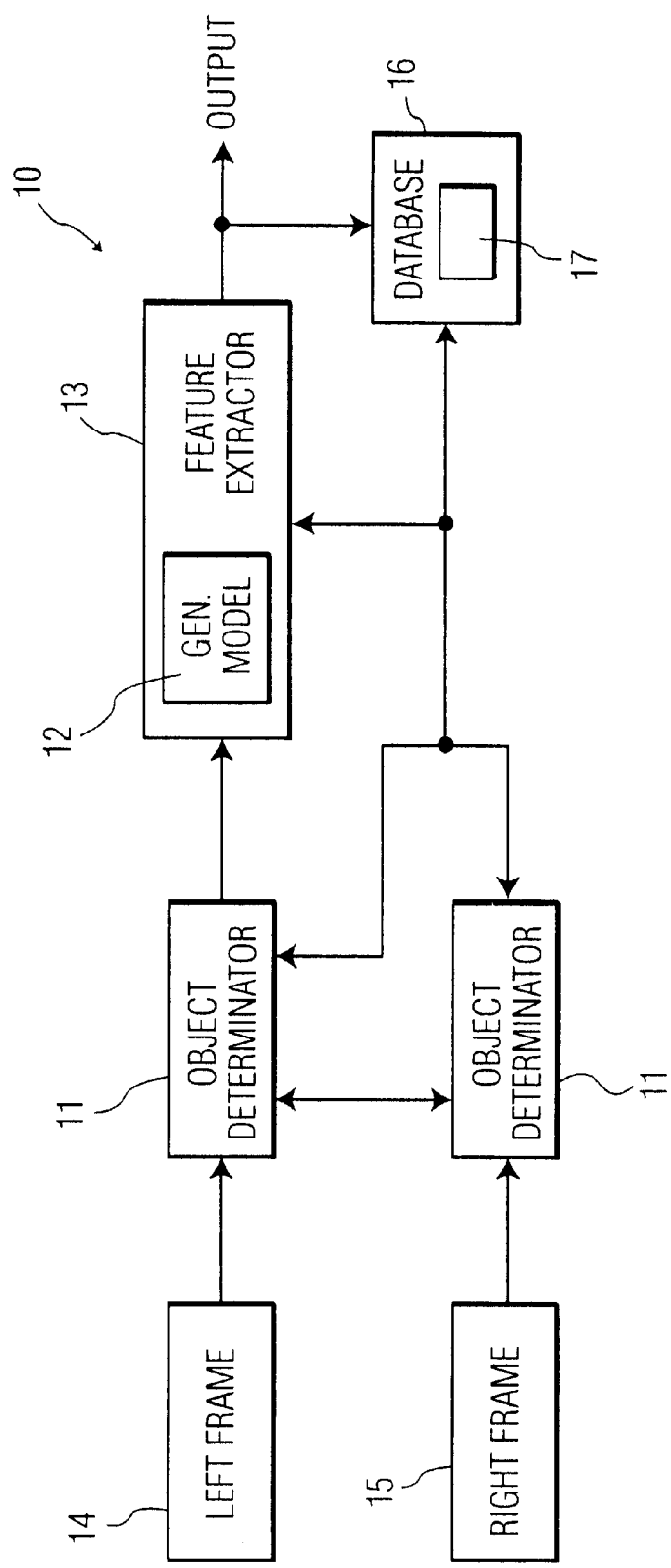
FIG. 1 is a block diagram of a feature extraction system in accordance with one aspect of the present invention.

Referring now to FIG. 1, an image processing system 10 is shown. The system 10 includes at least one object determinator 11, a feature extraction unit 13 and a model 12. While two object determinators 11 are shown in FIG. 1, it should be understood that one unit may be used. The model 12 approximates an object to be located in an image. The object maybe anything that can be approximated by a model such as a human face or any other physical object or measurable phenomenon.

Image data comprising a left frame 14 and a right frame 15 is input into the system 10. This input data may be received, for example, from another system such as a video conferencing system, a security system, animation system or from a remote/local data source. The left and right frames (e.g., stereo) may be digital or analog. If the image data is analog than an analog-to-digital circuit can be used to convert the data to a digital format. Of course, non-stereo input data or only one input source may also be used.

The object determinator 11 may use conventional color tone detection or template matching approaches to determine the presence/existence of an object in the left and right frames 14 and 15. Preferably, a biometrics-based/disparity method is used by the object determinator 11, as described in U.S. patent application Ser. No. 09/385,280, filed Aug. 30, 1009, incorporated herein by reference. For example, in this situation, disparity information is used to determine/locate a position of a human head in the left and right frames 14 and 15.

The model 12 is applied to the object determined/located by the object determinator 11. The level of detail of the model 12 may be tailored to the particular needs of the application, e.g., video coding or animation, i.e., from generic to highly detailed. The model 12 is used to quickly determine the approximate positions of one or more specific features of the object. For example, if the object is a human face, the more specific features could be the eyes, nose and mouth.

Figure 2:
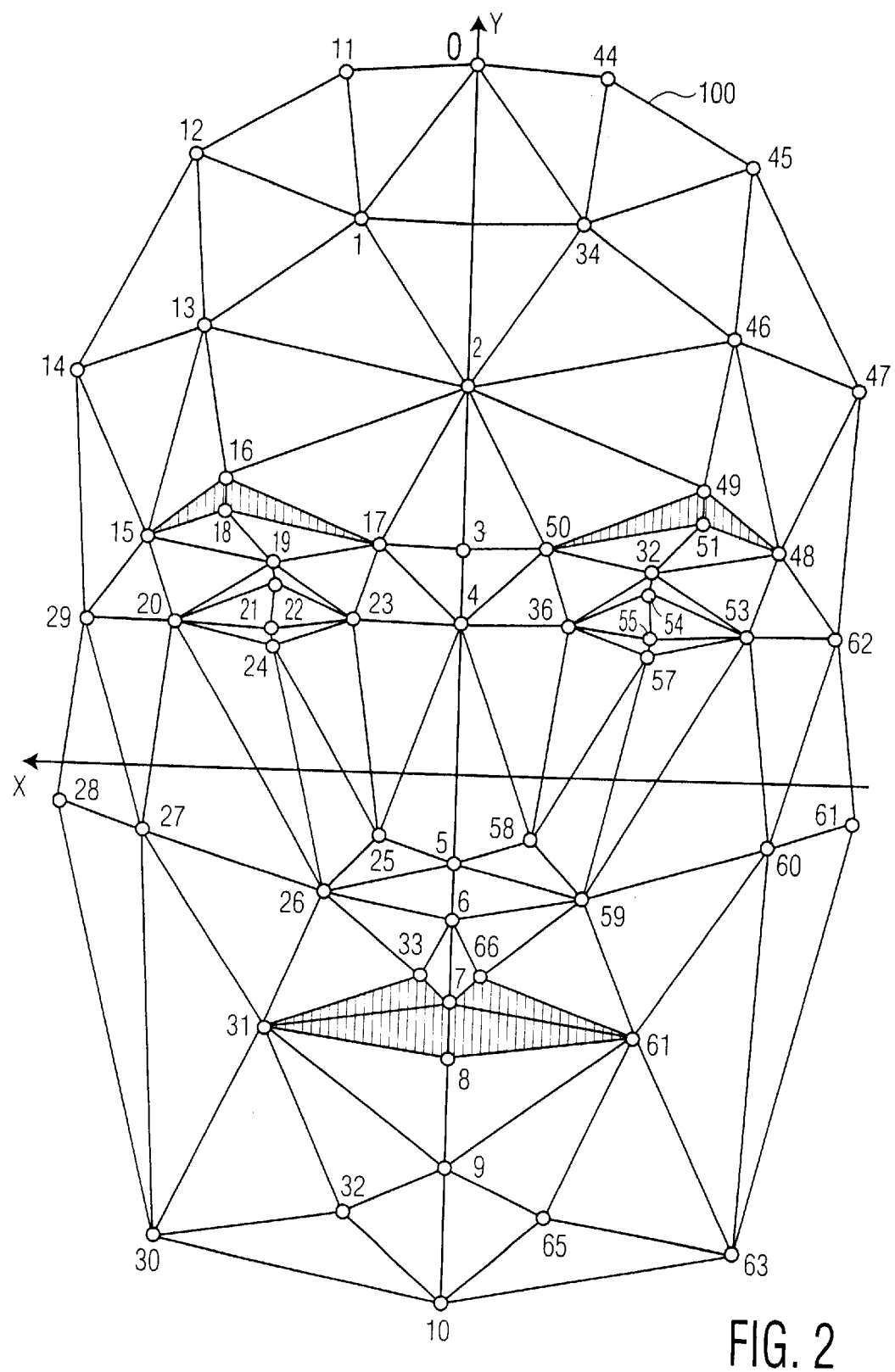
FIG. 2 is a schematic front view of an exemplary human face model.

Illustratively, FIG. 2 shows an example of a human face model 100 based upon a face segmentation technique. The model 100 is created using a dataset that describes a parameterized face. This dataset defines a three-dimensional description of the human face object. The parameterized face is given as an anatomically-based structure by modeling muscle and skin actuators and force-based deformations.

As shown in FIG. 2, a set of polygons define the model 100. Each of the vertices of the polygons are defined by X, Y and Z coordinates. Each vertex is identified by an index number. A particular polygon is defined by a set of indices surrounding the polygon. A code may also be added to the set of indices to define a color for the particular polygon. Specific vertices define the approximate position of the eyes, nose and mouth.

Based in part upon the model 12, the feature extractor 13 determines the actual position/location of the specific features. The determination can be quickly performed because the search/determination is localized to a specific area of the left or right frame 14 or 15 in accordance with the model 12. In this embodiment, the model 12 is used a template to determine and/or narrow where to start searching for the specific features.

Preferably, the feature extractor 13 uses a disparity map to extract specific feature positions or coordinates from the left and right frames 14 and 15, as described in U.S. patent application Ser. No. 09/385,280. As related to FIG. 2, these positions correlate to the various vertices of the model 100. For example, in regard to the nose, the feature extractor 13 preferably provides information directly related to vertices 4, 5, 23 and 58 as shown in FIG. 2. The feature extractor 13 may also incorporate modeling methods and systems described in U.S. patent application Ser. No. 09/422,735, filed Oct. 21, 1999, incorporated herein by reference.

Using the extracted specific feature information, the polygon vertices of the model 100, for example, can be adjusted to more closely match a particular human face. In particular, based on the information and processing performed by the feature extractor unit 13, the model 100 template may be adapted and animated to enable movement, expressions and synchronize audio (i.e., speech). Essentially, the model 100 may be dynamically transformed in real-time to more closely approximate a particular human face.

The invention, however, is not limited to 3D face models. The invention may be used with models of other physical objects and scenes; such as 3D or 2D models of automobiles, rooms and data structures. In this embodiment the feature extractor 13 gathers information related to the particular object or scene in questions, e.g., the position of wheels or the location data items. Further processing is then based on this information.

In a preferred embodiment, the system 10 outputs the coordinates/location of the specific features of the object. This information may be stored in a database 16 and used as feedback to improve performance.

In one embodiment, the database 16 may contain a set 17 of objects previous processed by the system 10 or recognized (e.g., a list of specific faces related to individuals attending a video conference or a list of specific faces related to individuals employed by a specific company). Once an object (under determination) is identified to be included the set 17, the model 12 may be customized for that object.

In this embodiment, the feature extractor 13 may be skipped or only used periodically to further improve the speed of processing. For example, the feature extractor 13 may be used only on "key" frames (in a MPEG format). Features of other non-key frames can be determined by tracking corresponding feature points in a temporal fashion. This is particularly effective in a video stream of data such as from a video conference.

The output of the system 10 may also be used in conjunction with model-based coding as described in U.S. patent application Ser. No. 09/422,735.

Figure 5:
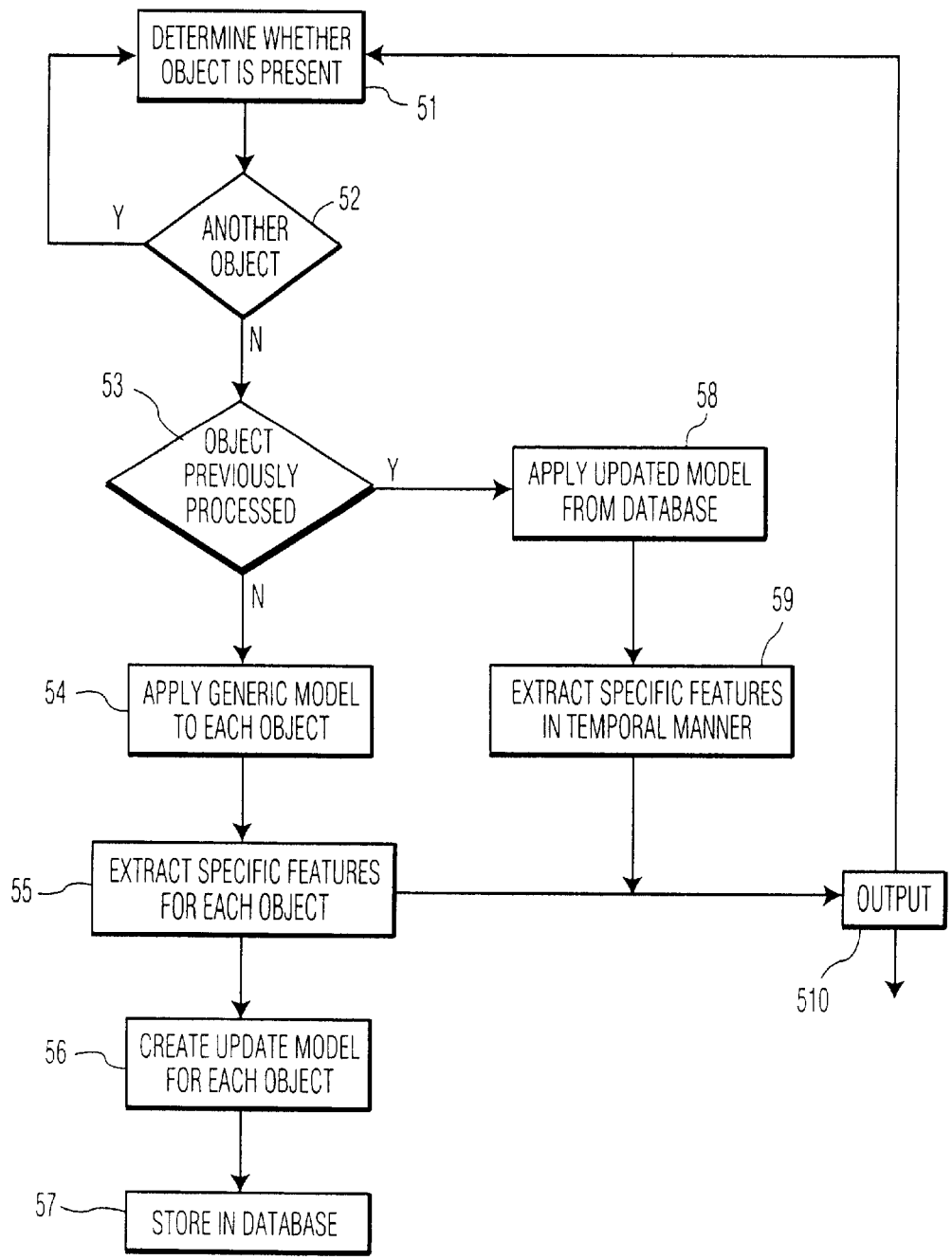
FIG. 5 is a flow chart of a process in accordance with one embodiment of the invention.

FIG. 5 shows a flow diagram of various steps performed in accordance with a preferred embodiment of the present invention. As shown in S2, multiple objects may be processed. For example, the present invention may locate and process the faces (in an image) of all person attending a video conference. In S3, it is determined whether the object as been previously processed or recognized by comparing information related to the object to model/data of known objects stored in the database 16. The object may also be identified as previously processed by estimating the position/movement of the object from a previous frame. For example, if an object is located at position A in an image, in subsequent frames, if an object is located at position A plus or minus a positional value Δ (and/or, as a double check, information related to that object matches data in the database 16), then that object is identified as the previously processed object. The value of Δ is variable based upon the particular image being processed; slow moving objects would have a small Δ and fast moving objects would have a larger Δ.

In S6 and S7, if the object is not known, an updated model based upon a generic model is created and stored in the database 16. Once an updated model is applied to the object, extraction of specific features may be performed in a temporal manner in S9. In S10, output information is also used as feedback data. This enables the system 10 to more quickly locate the object in the image because the feedback data may be used an approximate location (i.e., coordinate/position data) to being searching for the object in subsequent images/frames of input data.

The database 16 also provides another significant advantage. This embodiment allows for a compact and efficient system and method of storing a large number of features related to an object. In contrast, conventional systems require a large amount of memory to store information related to a digital image. Based upon the information stored in the database 16, the entire image or at least important aspects of the image may be recreated locally or the image maybe transmitted to be recreated at a remote site.

In a preferred embodiment, the system 10 is implemented by computer readable code executed by a data processing apparatus. The code may be stored in a memory within the data processing apparatus or read/downloaded from a memory medium such as a CD-ROM or floppy disk. In other embodiments, hardware circuitry may be used in place of, or in combination with, software instructions to implement the invention. For example, the invention may be implemented on a digital television platform using a Trimedia processor for processing and a television monitor for display. The invention can also be implemented on a computer 30 shown in FIG. 3.

Figure 3:
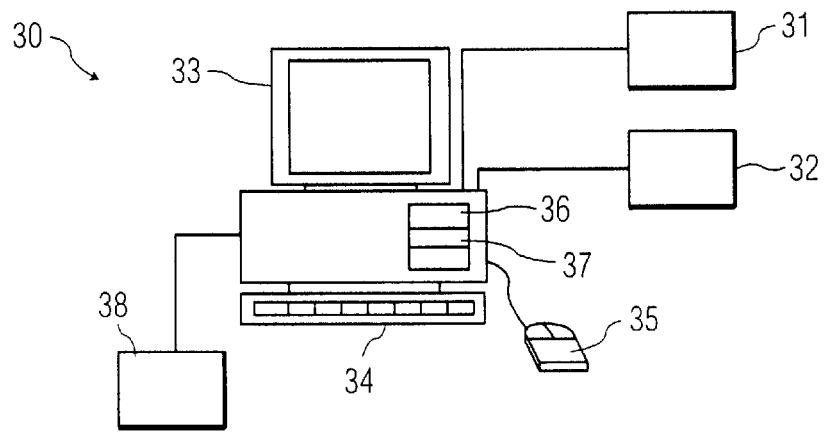
FIG. 3 is a block diagram of an exemplary computer system capable of supporting the system of FIG. 2.

As shown in FIG. 3, the computer 30 includes a network connection 31 for interfacing to a data network, such as a variable-bandwidth network or the Internet, and a fax/modem connection 32 for interfacing with other remote sources such as a video or a digital camera (not shown). The computer 30 also includes a display 33 for displaying information (including video data) to a user, a keyboard 34 for inputting text and user commands, a mouse 35 for positioning a cursor on the display 33 and for inputting user commands, a disk drive 36 for reading from and writing to floppy disks installed therein, and a CD-ROM drive 37 for accessing information stored on CD-ROM. The computer 30 may also have one or more peripheral devices attached thereto, such as a pair of video conference cameras for inputting images, or the like, and a printer 38 for outputting images, text, or the like.

Figure 4:
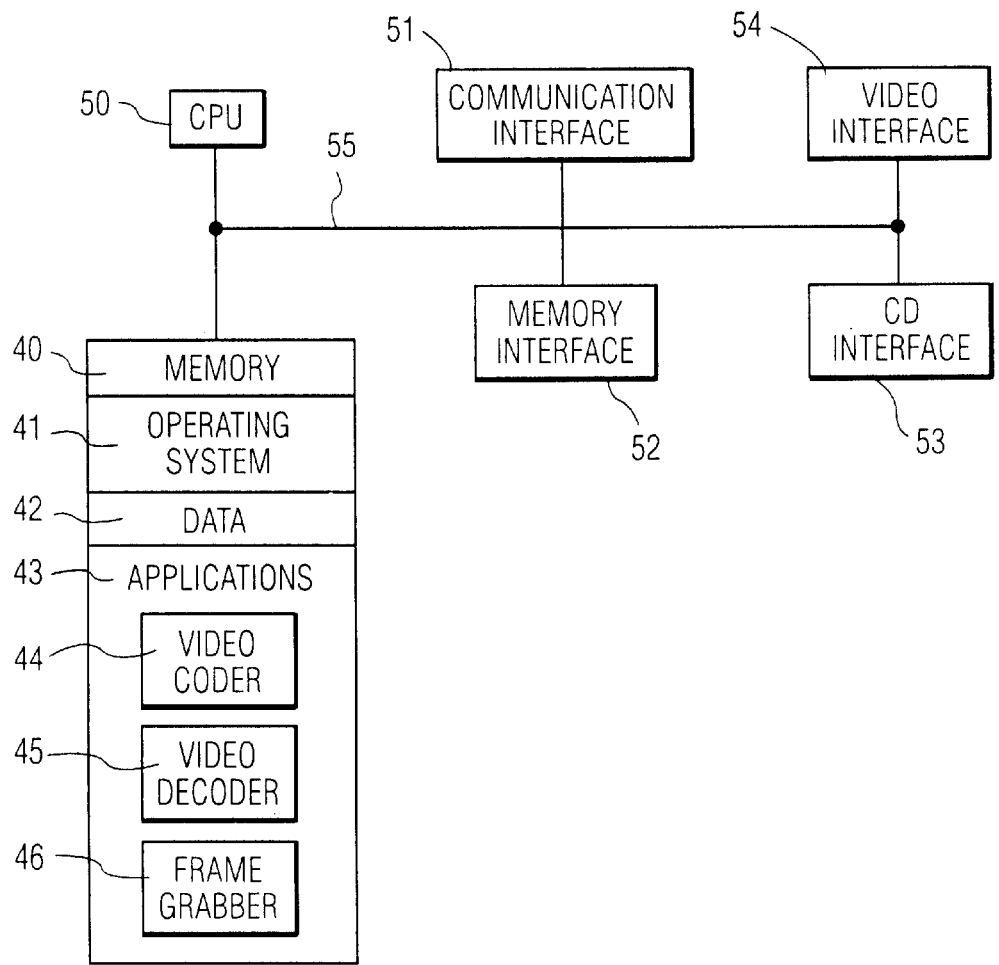
FIG. 4 is a block diagram showing the architecture of the computer system of FIG. 3.

FIG. 4 shows the internal structure of the computer 30 which includes a memory 40 that may include a Random Access Memory (RAM), Read-Only Memory (ROM) and a computer-readable medium such as a hard disk. The items stored in the memory 40 include an operating system 41, data 42 and applications 43. The data stored in the memory 40 may also comprise temporal information as described above. In preferred embodiments of the invention, operating system 41 is a windowing operating system, such as UNIX; although the invention may be used with other operating systems as well such as Microsoft Windows95. Among the applications stored in memory 40 are a video coder 44, a video decoder 45 and a frame grabber 46. The video coder 44 encodes video data in a conventional manner, and the video decoder 45 decodes video data which has been coded in the conventional manner. The frame grabber 46 allows single frames from a video signal stream to be captured and processed.

Also included in the computer 30 are a central processing unit (CPU) 50, a communication interface 51, a memory interface 52, a CD-ROM drive interface 53, a video interface 54 and a bus 55 The CPU 50 comprises a microprocessor or the like for executing computer readable code, i.e., applications, such those noted above, out of the memory 50. Such applications may be stored in memory 40 (as noted above) or, alternatively, on a floppy disk in disk drive 36 or a CD-ROM in CD-ROM drive 37. The CPU 50 accesses the applications (or other data) stored on a floppy disk via the memory interface 52 and accesses the applications (or other data) stored on a CD-ROM via CD-ROM drive interface 53.

Application execution and other tasks of the computer 30 may be initiated using the keyboard 34 or the mouse 35.

Output results from applications running on the computer 30 may be displayed to a user on display 34 or, alternatively, output via network connection 31. For example, input video data may be received through the video interface 54 or the network connection 31. The input data may be decoded by the video decoder 45. Output data from the system 10 may be coded by the video coder 44 for transmission through the video interface 54 or the network interface 31. The display 33 preferably comprises a display processor for forming video images based on decoded video data provided by the CPU 50 over the bus 55. Output results from the various applications may be provided to the printer 38.

While the present invention has been described above in terms of specific embodiments, it is to be understood that the invention is not intended to be confined or limited to the embodiments disclosed herein. On the contrary, the present invention is intended to cover various structures and modifications thereof included within the spirit and scope of the appended claims.

What is claimed is:

1. An image processing device comprising:

an object determinator arranged to determine whether an object is present in image data and to identify a predetermined type of object from a plurality of predetermined types of objects in a database;

at least one front end model of the object having an image that generally corresponds to the object identified by the object determinator; the object determinator further determines whether the front end model is identified as a generic model of the image or a specific model of the image; and a feature extractor coupled to the object determinator which selects the predetermined type of front end model determined by the object determinator, and said feature extractor identifies at least one feature of the object by defining regions of interest, wherein the feature is identified in accordance with the model.

2. The device according to claim 1, wherein identification of the feature includes determining coordinate or location data of the feature in the image data.

3. The device according to claim 1, wherein the model of the object can be adjusted based upon the feature identified by the feature extractor to more closely approximate the image of the object.

4. The device according to claim 3, wherein the object determinator is further arranged to determined whether the object has been processed previously by a biometric comparison with specific objects of the predetermined type in the database, and wherein the feature is then identified in accordance with an adjusted model.

5. The device according to claim 4, wherein the feature extractor is used only on key frames if the object has been processed previously by the device.

6. The device according to claim 1, further comprising a memory capable of storing information based upon the feature.

7. A method of determining at least one feature of an object in image data comprising the steps of:

(a) determining whether the object is present in the image data and identifying a predetermined type of the object from a plurality of predetermined types of objects in a database;

(b) applying a front end model to the determined object having an image that generally corresponds to the object identified in step (a);

(c) determining whether the front end model is identified as a generic model of the image or a specific model of the image;

(d) identifying at least one feature of the object in accordance with the model.

8. The method according to claim 7, wherein said identifying step includes determining coordinate or location data of the feature in the image data.

9. The method according to claim 7, further comprising the step of adjusting the model based upon the identified feature to more closely approximate the object.

10. The method according to claim 9, wherein said determining step includes determining whether the object has been processed previously by a performing a biometric comparison with specific objects of the predetermined type in the database, and, wherein the feature is then identified in accordance with an adjusted model.

11. The method according to claim 10, wherein said identifying step is performed in a temporal manner based upon the adjusted model.

12. The method according to claim 10, wherein if the object has been processed previously then only adjusting the model on key frames of the object.

13. The method according to claim 7, wherein said applying step applies the model as a template to facilitate identification of the feature.

14. The method according to claim 7, further comprising the step of storing information based upon the at least one feature.

15. A computer-readable memory medium including code for processing image data, the code comprising:

code to determine whether an object is present in the image data and to identify whether the object is a predetermined type of object identified from a plurality of predetermined types of objects in a database;

code to define at least one front end model of the object having an image that generally corresponds to the object identified;

code to determine whether the front end model is identified as a generic model of the image or a specific model of the image; and code to identify at least one feature of the object, wherein the feature is identified in accordance with the model.

16. The memory medium according to claim 15, wherein identification of the feature includes determining coordinate or location data of the feature in the image data.

17. The memory medium according to claim 15, wherein the model code can be adjusted based upon the identified feature to more closely approximate the object.

18. The memory medium according to claim 17, wherein the determining code includes code to determine whether the object has been processed previously by a biometric comparison with specific objects of the predetermined type in the database, and, wherein the feature is then identified in accordance with an adjusted model.

19. The memory medium according to claim 18, further comprising code that adjusts the identified feature only during selected key frames if the object has been processed previously.

20. The memory medium according to claim 15, further comprising code to store information based upon the at least one feature in a memory means.

* * * * *